United States Patent [19]
Roselius et al.

[11] 3,843,824
[45] Oct. 22, 1974

[54] METHOD FOR THE PRODUCTION OF CAFFEINE-FREE COFFEE EXTRACT

[75] Inventors: Wilhelm Roselius, Bremen-St. Magnus; Otto Vitzthum, Bremen; Peter Hubert, Bremen-Lesum, all of Germany

[73] Assignee: HAG Aktiengesellschaft, Bremen, Germany

[22] Filed: Apr. 19, 1972

[21] Appl. No.: 245,501

[30] Foreign Application Priority Data
Apr. 22, 1971 Germany............................ 2119678

[52] U.S. Cl.................. 426/386, 426/427, 426/478
[51] Int. Cl. .............................................. A23f 1/10
[58] Field of Search ............ 99/71, 70, 69; 426/386, 426/427, 478

[56] References Cited
UNITED STATES PATENTS
| | | | |
|---|---|---|---|
| 1,640,648 | 8/1927 | Cross | 99/69 |
| 2,345,378 | 3/1944 | Brandt | 99/71 |
| 2,542,119 | 2/1951 | Cole | 99/71 |
| 2,563,233 | 8/1951 | Gilmont | 99/71 |
| 3,477,856 | 11/1969 | Schultz | 99/71 X |

FOREIGN PATENTS OR APPLICATIONS
| | | | |
|---|---|---|---|
| 1,106,468 | 3/1968 | Great Britain | 99/71 |
| 1,057,911 | 2/1967 | Great Britain | |

*Primary Examiner*—Frank W. Lutter
*Assistant Examiner*—William L. Mentlik
*Attorney, Agent, or Firm*—Burgess, Dinklage & Sprung

[57] ABSTRACT

A method for the production of a caffein-free coffee product which comprises separating coffee oil by extraction of roasted coffee with a dry supercritical fluid, separating caffein from the roasted coffee by extraction with wet supercritical carbon dioxide, producing an extract from the decaffeinated roasted coffee and recovering the extracted coffee oil and adding at least a portion thereof to a coffee extract.

17 Claims, 3 Drawing Figures

METHOD FOR THE PRODUCTION OF CAFFEINE-FREE COFFEE EXTRACT

BACKGROUND OF THE INVENTION

The presently known methods for decaffeinating coffee are limited mostly to raw coffee. The reason why the conventional methods are not used for roast coffee is primarily that the treatment with the solvent leads to undesirable changes in aroma and taste.

The method of U.S. Pat. No. 2,563,233 tries to eliminate these disadvantages by extracting first the aroma constituents and fatty substances from the ground roast coffee with a solvent that is inert to the sensitive aroma substances, after which this pretreated coffee is decaffeinated with solvents like chloroform, which treatment is followed by the preparation of the extract, and the extract is finally re-aromatized with aroma substances which have been separated from the fatty substances by molecular distillation.

Apart from the costly equipment, a disadvantage of this method is that the aroma substances must be separated from the fatty substances and from the organic solvents by distillation, and that thermal damage as well as loss of highly volatile portions is unavoidable.

According to British Patent No. 700,598 the aroma substances are expelled from the ground roast coffee by heating in an inert gas; subsequently the fats and caffeine are extracted from the coffee by solvent extraction, for example, with trichloroethylene, and then the aroma substances are added to the pretreated coffee.

But this way it is only possible to obtain the highly volatile aroma substances; the less volatile fat-soluble aroma substances are extracted together with the caffeine and are thus lost. The product used for re-aromatization therefore does not correspond to the original aroma. The method has the further disadvantage that the high temperatures required for expelling the aroma substances impair the taste and odor of the aroma substances which are essential for the taste and odor of the coffee and thus for its quality.

Another disadvantage of both known methods is the great expenditure of time and energy for the absolutely necessary extraction even of the last traces of the organic solvents used from the coffee.

All known methods for decaffeinating roast coffee result therefore in a loss of aroma substances which lead to a reduction in the quality of the coffee thus treated.

From British Patent No. 1,106,468 it is also known to extract aroma substances from ground roast coffee by means of gaseous and/or liquid carbon-dioxide and to add these aroma substances again after the production of the coffee-extract.

A disadvantage of this method is that the extraction of the aroma substances takes place with gaseous carbon dioxide, at relatively high temperatures in the range of 80 to 110 deg.C and that it is in addition incomplete, because only the volatile aroma substances are extracted, so that the part of the aroma substances remaining in the coffee is subject to the harmful conditions of the preparation of the extract. The patent therefore points out that the extraction with gaseous carbon dioxide should be preferably followed by an additional extraction stage with liquid carbon dioxide, and that in this case some fatty substances are also extracted. But the extraction of these fats is incomplete; under these conditions only few or none of the antioxidations found in the coffee oil are extracted, so that the aroma extract is highly sensitive to oxidation.

The object of the invention is to provide for the production of coffee extract from a ground coffee roast which is decaffeinated in the roasted state with physiologically harmless $CO_2$ and from which the aroma components which can be undesirably changed in the conventional extraction-methods for the production of coffee sirups (for spray- or freeze-dried coffee extracts etc.) are in addition gently extracted.

According to an earlier proposal, the coffee oil containing the aroma substances is extracted from coarse ground roast coffee with supercritical $CO_2$ in the fluid phase in circulation at pressures above 80 excess atmospheres and at temperatures above 31.3°C., preferably at temperatures between 40 and 170°C. and at pressure of up to 2000 excess atmospheres. It can be obtained from the current of the supercritical $CO_2$ by varying its dissolving capacity by cooling and condensation. This procedure is described in our copending U.S. application Ser. No. 222,624, filed Feb. 1, 1972 the disclosure of which is hereby incorporated by reference. The extract obtained in this method contains not only the aroma substances, but also the oil contained in the roast coffee, on which the volatile aroma substances are adsorbed as a matrix and thus become storable, because the oil extract also contains the anti-oxidants. With this method, which can also be carried out with other gases, like $SF_6$, $CHF_3$, $CHF_2Cl$, $CF_3Cl$, and $C_3F_8$ as an extraction agent instead of $CO_2$, it is possible to extract up to 10 to 12 percent oil. The fact utilized here is that dry, supercritical, hence fluid $CO_2$ (as well as the other fluids mentioned above) is a good solvent for aroma oil, which can be extracted this way from roast coffee without any impairment of the aroma.

The supercritical fluids used in the earlier proposal include carbon dioxide, sulfur hexafluoride, and halogenated hydrocarbons containing up to about three carbon atoms in which the major proportion of the hydrogen atoms is replaced with halogen and in which the critical temperature is from about 30°C. to 100°C. The extraction, as aforesaid, is carried out at a pressure of at least 80 excess atmospheres. The temperature is above 30°C.

THE INVENTION

Surprisingly it was found that caffeine can be extracted from roast coffee in a particularly simple, effective and gentle manner if the coffee oil containing the aroma substance is first extracted from the coffee in the above mentioned manner, the coffee is wetted so that it contains about 20 to 55 percent water, and a current of wet supercritical carbon dioxide is then conducted through the coffee. The gas current is laden primarily with caffeine as well as with residues of any aroma oil still contained in the coffee.

The method according to the invention for the production of substantially caffeine-free coffee product or extract by separating the aroma substances, extracting the caffeine and re-aromatizing the decaffeinated product comprises the steps including:

1. the coffee oil containing the aroma substances is extracted from the rough-ground coffee with a circulating dry supercritical fluid of the class illustrated above, 2. the extracted rough-ground material is wetted with water and extracted with wet supercritical $CO_2$ to remove the caffeine, 3. the water-soluble constituents in the roughground coffee are extracted in known manner with water to produce an aqueous extract and 4. the water is removed from the extract to obtain a powder residue, 5. the powder obtained is aromatized with at least a portion of the coffee oil obtained in the first stage.

The water may be removed in step 4 by, for example, spray or freeze drying.

"Supercritical" in the sense of the invention means above the critical temperature and above the critical pressure. For $CO_2$ this means above 31.3°C. and above a pressure of about 80 atmospheres, excess.

A special advantage of the method is a substantially shorter treatment period compared to the known methods.

It is known from the literature that the dissolving capacity of gases increases with rising pressure and attains a maximum at high pressures, which correspond to the dissolving capacity of the normal liquid (see Journal of Chromatographic Science, 7 (1969) p. 277).

In contrast to this method it was found surprisingly according to the invention that the dissolving capacity of fluid supercritical phases can be higher by orders of magnitude than that of the respective liquids; this was shown in comparison tests where roast coffee was treated with dry, supercritical carbon dioxide in an apparatus according to FIG. 1 and according to the method corresponding to the following example 1 (tests a and b). For comparison an extraction was effected in the same apparatus (after disconnecting the heat exchanger) with liquid carbon dioxide (test c). The yields were converted to the amount of carbon dioxide necessary to obtain oil containing 1 kg aroma substances. The results are compiled in the following table.

| Test | Phase | Temp. °C. | Pressure excess at. | kg $CO_2$ for 1 kg aroma oil |
|---|---|---|---|---|
| a | supercritical | 33 | 310 | 390 |
| b | do. | 70 | 310 | 373 |
| c | liquid | 29 | 90 | 29,400 |

Since the extracting agent is circulated according to the invention, the above result means that the same effects are obtained utilizing the extraction method of this invention with a supercritical gas as can be obtained following the old liquid gas method even with a number of cycles through the extraction apparatus which is almost 2 orders of magnitude lower than required for the old method.

The preferred grain size of the roast coffee for the extraction method according to the invention is 2 to 6 mm, with the bulk between 4 and 5 mm.

In order to protect the material it is preferred to carry out the extraction of the coffee oil containing the aroma substances as well as the caffeine extraction at temperatures of 40°C. to 50°C.; the pressure is preferably in the range above 180 excess atmospheres, a pressure of about 350 excess atmospheres representing the upper limit for practical and economical reasons.

The separation of the aroma oil is effected preferably by reducing the pressure to about 58 to 65 excess atmospheres while maintaining the temperature of 40°C. to 50°C.

The extent of the aroma portion in the caffeine depends on how thoroughly the coffee was treated in the preceding stage of the oil extraction with dry $CO_2$ and how much caffeine is to be separated during the decaffeination. Since the gas current must be circulated it is necessary to separate the absorbed substances before the gas enters again the extraction vessel. There are several possibilities to achieve this. First it is possible to proceed according to the above mentioned older proposal by bringing the laden gas current to subcritical conditions, that is, by liquefying it. This is effected preferably by lowering the temperature to 20° to 25°C. This changes the dissolving capacity to a considerable extent in such a way that the substances previously absorbed by the supercritical phase are precipitated, that is, the system separates. From the vapor phase above the liquid $CO_2$ phase is exhausted the gaseous $CO_2$ which contains neither caffeine nor aroma oil, then heated to supercritical temperatures, compressed again by means of a compressor to the desired pressure, and then fed again to the extraction vessel, after it has first been laden preferably saturated with water. In practice 5 to 10 ml water are absorbed per kg, depending on the temperature of the $CO_2$ passing through (40°C. to 50°C.).

Another preferred possibility for separating the system comprises reducing the pressure to subcritical values, that is, in the case of carbon dioxide to less than about 72 excess atmospheres, preferably to 58 to 65 excess atmospheres, and/or to increase the temperature, preferably to about 80°C. to 120°C. The latter has the same effect as a pressure relief. For economical reasons a temperature increase can be eliminated. This method has the advantage, compared to the former method that hardly any water is separated in the relief phase, so that the circulating water portion remains substantially constant, the extracted material does not dry out, and the amount of water provided for wetting need not be replenished.

By this procedure a roast coffee can be obtained which has practically no more odor aroma and which contains only about 0.05 to 0.1 percent caffeine.

The caffeine is obtained as a yellow powder of about 85 to 95 percent purity. The balance consists of coffee oil residues.

It has been discovered that roast coffee decaffeinated according to this invention has a 4 to 6 percent higher extract content than roast coffee decaffeinated according to conventional methods. The loss caused by the extraction of caffeine is thus more than compensated. This is due to the greater porosity of the coffee, caused by the pressure treatment and subsequent relaxation during the emptying of the whole system.

The coffee is then subjected to an aqueous extraction for the production of caffeine-free coffee sirups or coffee extract. These initially appear to differ neither in flavor nor in aroma from the products obtained with the conventional methods.

The aroma oil obtained in the first stage, which is obtained in an amount of about 10 to 12 percent, based on the weight of the roasted beans, is then incorporated in known manner in the coffee extract powder obtained by evaporation of the water from the aqueous extract.

With the addition of 0.5 percent oil (oil not enriched) to the coffee extract, a mildly aromatic product is obtained which is superior in quality to the conventional products of the same type. With the addition of 0.5 percent oil aroma enriched at a 1:10 ratio according to conventional methods, for example, according to the method of molecular distillation, a highly aromatic product of hitherto unknown aroma intensity is obtained. About 20 percent of the oils obtained are processed. The balance of the oil obtained in the first stage can be used for aromatizing additional coffee originating from other productions. The above mentioned results with regard to the caffeine values of the roast coffee as well as the caffeine content of the $CO_2$ extract were obtained with only minor differences with the apparatus represented in FIGS. 1 to 3. The apparatus differ in the methods of separation of the system and in the methods of feeding the extracting agent. Specifically the procedures illustrated in the figures are as follows:

FIG. 1

The extraction takes place in vessel 1. It is charged with wet ground roast coffee. The separation of the system takes place in vessel 2. The heat-exchangers 3 and 4 which are arranged ahead of and behind the feed pump 5 temper the gas current to conditions which are necessary for the compression and feed. In practice the heat exchangers are coupled so that the heat of compression (Case 1) is partly given off to the adsorbed medium and is used partly for feeding the energy of evaporation in 2. The same holds true for cases 2 to 4.

Case 1: Conditions:

$$p_2 < p_{crit} < p_1$$
$$t_2 < t_{crit} < t_1$$

absolute values:

$p_1 = 180$ to 350 excess atmospheres $t_1 = 40°$ to 50°C.

$p_2 = 58$ to 65 excess atmospheres $t_2 = 20°$ to 25°C.

Since the liquefaction of $CO_2$ takes place here in vessel 2, where water is also withdrawn from the cycle, the gas must be wetted in vessel 6 before it enters again in into vessel 1.

Case 2: Conditions:

$$p_2 = p_1 < p_{crit}$$
$$t_2 < t_1 < t_{crit}$$

absolute values:

$p_2 = p_1 = 180$ to 350 excess atmospheres $t_1 = 40$ to 50°C.

$t_2 = 80°$ to 120°C.

Here there is practically no separation of water in 2 so that wetting of the coffee before it is used again is sufficient. But this can also be effected by the wet $CO_2$ itself. In both cases the amount of circulating water is practically constant after a certain starting time.

Case 3: Conditions:

$$p_2 < p_{crit} < p_1$$
$$t_2 = t_1 > t_{crit}$$

absolute values:

$p_1 = 180$ to 350 excess atmospheres $p_2 = 58$ to 65 excess atmospheres $t_2 = t_1 = 40°$ to 50°C.

Case 4: Conditions:

$$p_2 < p_{crit} < p_1$$
$$t_2 > t_1 > t_{crit}$$

absolute values:

$p_1 = 180$ to 350 excess atoms.

$p_2 = 58$ to 65 excess atmos.

$t_1 = 40°$ to 50°C.

$t_2 = 80°$ to 120°C.

For water balance see Case 2.

FIG. 2

The equipment differs from FIG. 1 only by the feeding means, which is here a fluid pump 7. The gas current must therefore be liquefied in any case before it enters the pump and be brought to supercritical conditions after leaving the pump. Here again the heat exchangers are coupled in a suitable manner, but certain additional heating- or cooling means are indispensable, as illustrated in FIGS. 1 and 3.

Case 5: Conditions:

$$p_2 = p_1 > p_{crit}$$
$$t_2 > t_1 > t_{crit}$$

absolute values:

$p_2 = p_1 = 180$ to 350 excess atmos.

$t_1 = 40°$ to 50°C.

$t_2 = 80°$ to 120°C.

For water balance see Case 1.

Case 6: Conditions:

$$p_2 < p_{crit} < p_1$$
$$t_2 = t_1 > t_{crit}$$

absolute values:

$p_1 = 180$ to 350 excess atmospheres $p_2 = 58$ to 65 excess atmospheres $t_2 = t_1 = 40°$ to 50°C.

For water balance see Case 2.

Case 7: Conditions:

$$p_2 < p_{crit} < p_1$$
$$t_2 > t_1 > t_{crit}$$

absolute values:

$p_1 = 180$ to 350 excess atmospheres
$p_2 = 58$ to 65 excess atmospheres
$t_1 = 40°$ to $50°°C$.
$t_2 = 80°$ to $120°C$.

For water balance see Case 2.

FIG. 3

The equipment differs from FIG. 2 in that the separating vessel 8 is designated as a sorption column which can be filled with activated charcoal, kieselguhr, etc. In the heat exchanger arranged ahead of vessel 8 the gas is liquefied and the precipitated caffeine is retained in the sorption column. On the bottom of the column liquid $CO_2$ is withdrawn from the pump and introduced again into the cycle. Due to the liquefaction, water is withdrawn here which must be fed again to the wetting vessel 6. The removal of caffeine from the activated charcoal can be effected in two ways. First the extraction can be effected with conventional solvents where the adhering coffee oil residue is first extracted with ether in which caffeine is difficulty soluble, and then the caffeine itself is removed with methylene chloride or chloroform, etc. Second, the separated substances can be absorbed again by dry supercritical $CO_2$ then separated in vessel 1 according to the various conditions mentioned above and finally removed as a dry substance, the direction of the heat transfer to the heat exchangers being naturally adapted in a corresponding manner.

Case 8: Conditions:

$$p_2 < p_{crit} < p_1$$
$$t_2 < t_{crit} < t_1$$

absolute values:

$p_1 = 180$ to 350 excess atmospheres
$p_2 = 58$ to 65 excess atmospheres
$t_1 = 40°$ to $50°C$.
$t_2 = 20°$ to $25°C$.

For water balance see Case 1.

Case 9: Conditions:

$$p_2 = p_1 > p_{crit}$$
$$t_2 < t_{crit} < t_1$$

absolute values:

$p_2 = p_1 = 180$ to 350 excess atmospheres
$t_1 = 40°$ to $50°C$.
$t_2 = 20°$ to $25°C$.

For water balance see Case 1.

The indicated absolute ranges of the quantities $p_1$, $p_2$, $t_1$, $t_2$ are those preferably used.

Which values are finally selected depends primarily on the specifications of the equipment used, especially the pressure tanks and heat exchangers. It depends also on how much caffeine is to be separated. If $p_2$ is always selected below p-crit. the system separates completely, but if we select $p_2$ greater than p-crit. but less than $p_1$, caffeine is primarily separated. If we select for $p_1$ higher pressures, with 350 excess atmospheres representing only a practical limit, more caffeine is absorbed by the gaseous phase than at slightly lower pressures. In the first case the number of extraction cycles will also be lower.

The following non-limiting examples are given by way of illustration only. In the examples, 1, 6 and 7 denote the first extraction stage (obtaining the coffee oil containing the aroma substances) and 2 to 5 the second extraction stage (extraction of caffeine). Examples 1 and 4 together set forth the whole process up to a decaffeinated and re-aromatized coffee powder being obtained.

Example 1

400 g coarse-ground roast coffee with a caffeine content of 1.25 percent were treated in the apparatus according to FIG. 2 with dry $CO_2$. The following conditions according to Case 6 were maintained $p_1 = 330$ excess atmospheres $\quad t_1 = 45°C$.
$p_2 = 60$ excess atmospheres $\quad t_2 = 45°C$.

running time: 5 hours total amount of $CO_2$ circulates: 60 kg. (vessel 6 eliminated).

Result: 43 g aroma oil were separated in vessel 2. The extracted roast coffee still had a caffeine content of 1.10 percent.

Example 2

400 g rough-ground de-oiled roast coffee were wetted with 200 ml water and treated in the apparatus according to FIG. 1. The following conditions according to Case 1 were maintained:

$p_1 = 300$ excess atmosphreres $t_1 = 45°C$.
$p_2 =$ approx. 60 excess atmos. $t_2 = 22°C$.

filling of $6 = 300$ ml water running time: 5 hours total amount of $CO_2$ circulated: 60 kg.

Result: 200 ml water as well as 4.2 g caffeine contaminated with some residual oil were separated in vessel 2. The roast coffee still has the initial moisture as well as a caffeine content of 0.06 percent in the dry substance.

Example 3

400 g rough-ground de-oiled roast coffee were wetted with 300 ml water and treated in the apparatus according to FIG. 1. Conditions were maintained according to Case 3:

$p_1 = 350$ excess atmospheres $t_1 = 50°C$.
$p_2 =$ approx. 60 excess atmos. $t_2 = 50°C$.

filling of $6 = 100$ ml water running time: 4 hours total amount of $CO_2$ circulated: 43 kg.

Result: 4.5 g of a slightly moist caffeine with fewer impurities of residual oil than in Example 2 were separated in vessel 2.

The coffee still had the same initial moisture as well as a caffeine content of 0.05% in the dry substance.

Example 4

400 g rough-ground roast coffee de-oiled according to Example 1 were wetted with 300 ml water and treated in the same apparatus as Example 1 (according to FIG. 2) after vessel 2 (FIG. 2) filled with aroma oil having been replaced by an empty vessel. The decaffeination then took place under the conditions according to Case 7:

$p_1 = 250$ excess atmospheres $t_1 = 45°C.$ $p_2 = 58$ excess atmospheres $t_2 = 110°C.$ filling of 6: 100 ml water running time: 4 hours total amount of $CO_2$ circulated: 96 kg.

Result: 45 g of a slightly moist caffeine with few impurities of residual oil were separated in vessel 2. The water separated during the liquefaction was removed by the pump so that the circulating amount of water remained practically constant. The caffeine content of the roast coffee was still 0.05 percent in the dry product. The caffeine contained in vessel 2 was removed.

For the preparation of the aqueous extract, 1.5 water was then introduced into the same apparatus as Example 1 (according to FIG. 2) and the temperature in vessels 1 and 2 increased to 160°C. The respective pressure was 10 excess atmospheres. The water was circulated by the pump until a degreee of extraction of the roast coffee of 40 percent was achieved. The extracted roast coffee was removed. The sirup was spray dried in a separate spray drying plant. The spray extract powder was mixed in a suitable mixer with about 2 g of the aroma oil obtained according to Example 1 and provided an extract powder having a fresh coffee aroma.

Example 5

400 g rough-ground, de-oiled roast coffee were wetted with 400 ml water and treated in the apparatus according to FIG. 3. The conditions were according to Case 9:

$p_1 = p_2 = 280$ excess atmospheres $t_1 = 50°C., t_2 = 20°C.$ filling of vessel 6: 300 ml water running time: 4 hours total amount of $CO_2$ circulated: 96 kg.

Result: At the end of the decaffeination process the material adhering to kieselguhr was first eluted with ether, and about 1 g of oil was obtained. Subsequently the caffeine was removed with chloroform, yielding 4.6 g. The moisture content of the roast coffee was practically unchanged. The caffeine content was still 0.03 percent in the dry product. The water separated during the liquefaction was carried along and accumulated again after each cycle in the wetting vessel 6, so that this amount of water remained practically unchanged.

Example 6

230 g of coarsely ground roasted coffee (containing caffeine) are treated for 4 hours at 80°C. and at 290 excess atmospheres with $CHF_3$ (trifluoromethane) in the installation shown in FIG. 1.

Result: oil: 20 g of light brown clear oil aroma index 11.0

Aroma: slightly smoky

Coffee: extract content (water soluble) = 26 percent

Soluble in petroleum ether = 4 percent (before treatment 12.5 percent)

Fine grain fraction <0.5 mm = 2.5 percent

Example 7

250 g of coarsely ground roasted coffee (containing caffeine) are treated for 5 hours at 80°C. and at 300 excess atmospheres with a gas mixture consisting of 50 percent by weight $CO_2$ and 50 percent by weight $SF_6$ (sulfur hexafluoride) in the installation shown in FIG. 1.

Result: oil: 26 g of light brown clear oil aroma index 14

Aroma: slightly smoky, medium heavy

Coffee: extract content (water soluble) = 26.3 percent

Soluble in petroleum ether = 2 percent (before treatment 12.5 percent)

Fine grain fraction <0.5 mm = 2.8 percent.

It is of particular advantage if the method is carried out in combination in such a way that the material to be extracted is left in the same vessel not only for the first extraction (removal of the aroma oil) and the second extraction (removal of caffeine), but if the material is also subjected in the same vessel to the extraction with water, so that a single extraction vessel is used which is charged successively with dry $CO_2$, wet $CO_2$ and water.

We claim:

1. A method for the production of substantially caffeine-free coffee extract products which comprises
   a. separating coffee oil containing aroma substances by extraction of rough-ground roast coffee with a dry supercritical fluid having selective dissolving capacity for the coffee oil and aroma substances, at a pressure of at least 80 atmospheres excess and a temperature above 30°C.,
   b. wetting the thus extracted rough-ground coffee with water and extracting the thus wetted product with wet supercritical carbon dioxide to remove the caffeine in the rough-ground coffee.
   c. extracting the rough-ground coffee remaining from the previous step with water to produce an aqueous extract,
   d. drying said aqueous extract to obtain a powder residue,
   e. recovering the coffee oil containing aroma substances from the extraction of step a) and adding at least a portion thereof to a coffee extract.

2. A method as in claim 1 in which the coffee oil containing the aroma substances is extracted with dry carbon dioxide at a temperature of 40°C. to 50°C. and a pressure of 180 to 350 excess atmospheres and separated from the carbon dioxide by reducing the pressure thereof to 58 to 65 excess atmospheres.

3. A method as in claim 2 in which the extraction of the wet rough-ground coffee is carried out at a temperature of 40°C. to 50°C. and a pressure of 180 to 350 excess atmospheres.

4. A method as in claim 3 in which the carbon dioxide utilized from the wet extraction is liquefied at a temperature of from 20°C. to 25°C.

5. A method as in claim 3 in which the caffeine is recovered from the wet carbon dioxide by reducing the pressure thereof to 58 to 65 excess atmospheres.

6. A method as in claim 5 in which the temperature of the carbon dioxide is increased to 80°C. to 120°C.

7. A method as in claim 3 in which the caffeine is recovered from the wet carbon dioxide by increasing the temperature to 80°C. to 120°C.

8. A method as in claim 1 in which the extraction with the dry supercritical fluid, the extraction with wet supercritical carbon dioxide and the extraction with water are carried out in the same vessel which is charged successively with dry supercritical fluid, wet supercritical carbon dioxide, and water.

9. A method according to claim 1, wherein the supercritical fluid used for extraction of the coffee oil containing the aroma substances is at least one of $CO_2$, $SF_6$, $CHF_3$, $CHF_2Cl$, $CF_3Cl$ and $C_3F_8$.

10. A method according to claim 1, wherein the supercritical fluid used in step (a) is dry carbon dioxide.

11. A method according to claim 1, in which the coffee extract of step (e) is the coffee extract produced in step (d).

12. A method for the production of substantially caffeinefree coffee extract products which comprises
   a. separating coffee oil containing aroma substances by extraction of roasted coffee with a dry supercritical fluid having selective dissolving capacity for the coffee oil and aroma substances,
   b. separating caffeine from the roasted coffee from which coffee oil and aroma substances have been removed by extraction of the roasted coffee with wet supercritical carbon dioxide,
   c. extracting the roasted coffee from which caffeine has been removed with water to produce an aqueous extract,
   d. drying said aqueous extract to obtain a powder residue,
   e. recovering the coffee oil containing the aroma substances from the extraction of step (a) and adding at least a portion thereof to a coffee extract.

13. A method according to claim 12, in which the coffee extract of step (e) is the coffee extract produced in step (d).

14. A method for the production of substantially caffeinefree coffee extract products which comprises
   a. separating coffee oil containing aroma substances by extraction of roasted coffee with a dry supercritical fluid having selective dissolving capacity for the coffee oil and aroma substances,
   b. separating caffeine from the roasted coffee from which coffee oil and aroma substances have been removed by extraction of the roasted coffee with wet supercritical carbon dioxide,
   c. producing a coffee extract from the decaffeinated coffee,
   d. recovering the coffee oil containing the aroma substances from the extraction of step (a) and adding at least a portion thereof to a coffee extract.

15. A method according to claim 14, wherein the supercritical fluid used for extraction of the coffee oil containing the aroma substances is at least one of $CO_2$, $SF_6$, $CHF_3$, $CHF_2Cl$, $CF_3Cl$ and $C_3F_8$.

16. A method according to claim 14, wherein the supercritical fluid used in step (a) is dry carbon dioxide.

17. A method according to claim 14, in which the coffee extract of step (d) is the coffee extract produced in step (c).

* * * * *

UNITED STATES PATENT OFFICE
CERTIFICATE OF CORRECTION

Patent No. 3,843,824     Dated October 22, 1974

Inventor(s) Wilhelm Roselius, Otto Vitzthum and Peter Hubert

It is certified that error appears in the above-identified patent and that said Letters Patent are hereby corrected as shown below:

First page, [73], change "HAG Aktiengesellschaft, Bremen, Germany" to --Studiengesellschaft Kohle mbH, Mülheim/Ruhr, Germany--

Column 9, line 21, change "1.5 water" to --1.5 l water--

Insert the attached sheet of Drawing Figures, as part of Letters Patent 3,843,824

Signed and sealed this 22nd day of April 1975.

(SEAL)
Attest:

RUTH C. MASON
Attesting Officer

C. MARSHALL DANN
Commissioner of Patents
and Trademarks